(12) United States Patent
Kawano et al.

(10) Patent No.: US 11,953,384 B2
(45) Date of Patent: Apr. 9, 2024

(54) TEMPERATURE MEASURING DEVICE, MECHANICAL SYSTEM, TEMPERATURE MEASURING METHOD, AND PROGRAM

(71) Applicant: MITSUBISHI HEAVY INDUSTRIES, LTD., Tokyo (JP)

(72) Inventors: Masaya Kawano, Tokyo (JP); Masahiro Sugihara, Tokyo (JP); Tadashi Kimura, Tokyo (JP); Shinsuke Sato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 402 days.

(21) Appl. No.: 17/353,073

(22) Filed: Jun. 21, 2021

(65) Prior Publication Data

US 2022/0107228 A1   Apr. 7, 2022

(30) Foreign Application Priority Data

Oct. 2, 2020 (JP) ................................ 2020-168035

(51) Int. Cl.
*G01K 11/24* (2006.01)
*F16C 19/52* (2006.01)
*G01S 15/88* (2006.01)

(52) U.S. Cl.
CPC ............ *G01K 11/24* (2013.01); *F16C 19/525* (2013.01); *G01S 15/88* (2013.01)

(58) Field of Classification Search
None
See application file for complete search history.

(56) References Cited

U.S. PATENT DOCUMENTS

| | | | |
|---|---|---|---|
| 4,469,450 A | 9/1984 | DiVincenzo | |
| 2010/0111133 A1* | 5/2010 | Yuhas | G01K 17/00 374/30 |

FOREIGN PATENT DOCUMENTS

| | | |
|---|---|---|
| JP | 58-215519 A | 12/1983 |
| JP | 2003-042857 | 2/2003 |
| JP | 2007-212358 A | 8/2007 |
| JP | 4843790 | 12/2011 |
| JP | 2015-102481 A | 6/2015 |

* cited by examiner

*Primary Examiner* — Erica S Lin
(74) *Attorney, Agent, or Firm* — Wenderoth, Lind & Ponack, L.L.P.

(57) ABSTRACT

A temperature measuring device includes an ultrasonic sensor attached to a rear surface side of the structural body having the multilayer structure, an acquisition unit configured to, through the ultrasonic sensor, acquire a signal of a reflected wave of an ultrasonic wave incident at the internal side of the structural body, an extraction unit configured to extract, from the signal of the reflected wave, a domain including a reflected wave reflected on a surface on the internal side of the structural body, and an identification unit configured to, based on a signal of the reflected wave in the extracted domain, identify the temperature of the surface on the internal side of the structural body.

5 Claims, 11 Drawing Sheets

TEMPERATURE MEASURING DEVICE, MECHANICAL SYSTEM, TEMPERATURE MEASURING METHOD, AND PROGRAM

CROSS-REFERENCE TO RELATED APPLICATIONS

This application claims the benefit of priority to Japanese Patent Application Number 2020-168035 filed on Oct. 2, 2020. The entire contents of the above-identified application are hereby incorporated by reference.

TECHNICAL FIELD

The present disclosure relates to a temperature measuring device, a mechanical system, a temperature measuring method, and a program.

RELATED ART

JP 4843790 B discloses a temperature measuring method for using an ultrasonic wave to propagate in a medium, to thereby measure a temperature distribution in the medium.

SUMMARY

Bearings, applied to high speed rotary machines, are required to have very high load resistance and wear resistance. In order to cope with this, an increasing number of rotary machines now use a bearing having a multilayer structure in which a composite material having high load resistance and wear resistance is provided on a surface on an internal side of the bearing.

Typically, the temperature of a bearing is measured and monitored by a thermocouple or a temperature measuring resistor, each installed in a base material (back metal) that is positioned approximately several millimeters inward of a surface on the internal side of the bearing (a surface on the composite material). However, when the bearing has the multilayer structure, the composite material on the surface on the internal side of the bearing has low thermal conductivity. Thus, in the method described above, even when an anomaly occurs to cause a change in temperature of the surface on the internal side of the bearing, response to the change in temperature decreases. In other words, with the method described above, the temperature of the surface of the bearing having the multilayer structure cannot be monitored in a timely manner.

An object of the present disclosure is to provide a temperature measuring device, a mechanical system, a temperature measuring method, and a program, each configured to monitor, in a timely manner, the temperature of a surface on an internal side of a structural body having a multilayer structure.

An aspect of the present disclosure provides a temperature measuring device including an ultrasonic sensor attached to a rear surface side of a structural body having a multilayer structure, an acquisition unit configured to, through the ultrasonic sensor, acquire a signal of a reflected wave of an ultrasonic wave incident at an internal side of the structural body, an extraction unit configured to, from the signal of the reflected wave, extract a domain including a reflected wave reflected on a surface on the internal side of the structural body, and an identification unit configured to, based on a signal of the reflected wave in the extracted domain, identify a temperature of the surface on the internal side of the structural body.

An aspect of the present disclosure provides a temperature measuring method using an ultrasonic sensor attached to a rear surface side of a structural body having a multilayer structure, the temperature measuring method including the steps of acquiring, through the ultrasonic sensor, a signal of a reflected wave of an ultrasonic wave incident at an internal side of the structural body, extracting, from the signal of the reflected wave, a domain including a reflected wave reflected on a surface on the internal side of the structural body, and identifying, based on a signal of the reflected wave in the extracted domain, a temperature of the surface on the internal side of the structural body.

An aspect of the present disclosure provides a program executed by a computer for a temperature measuring device including an ultrasonic sensor attached to a rear surface side of a structural body having a multilayer structure, the program including the steps of acquiring, through the ultrasonic sensor, a signal of a reflected wave of an ultrasonic wave incident at an internal side of the structural body, extracting, from the signal of the reflected wave, a domain including a reflected wave reflected on a surface on the internal side of the structural body, and identifying, based on a signal of the reflected wave in the extracted domain, a temperature of the surface on the internal side of the structural body.

With each of the aspects of the present disclosure described above, it is possible to monitor, in a timely manner, the temperature of a surface of a bearing having a multilayer structure.

BRIEF DESCRIPTION OF DRAWINGS

The disclosure will be described with reference to the accompanying drawings, wherein like numbers reference like elements.

DESCRIPTION OF EMBODIMENTS

First Embodiment

A temperature measuring device and a mechanical system including the temperature measuring device, each according to a first embodiment, will be described below with reference to FIGS. 1 to 6.

Configuration of Mechanical System

Figure 1:
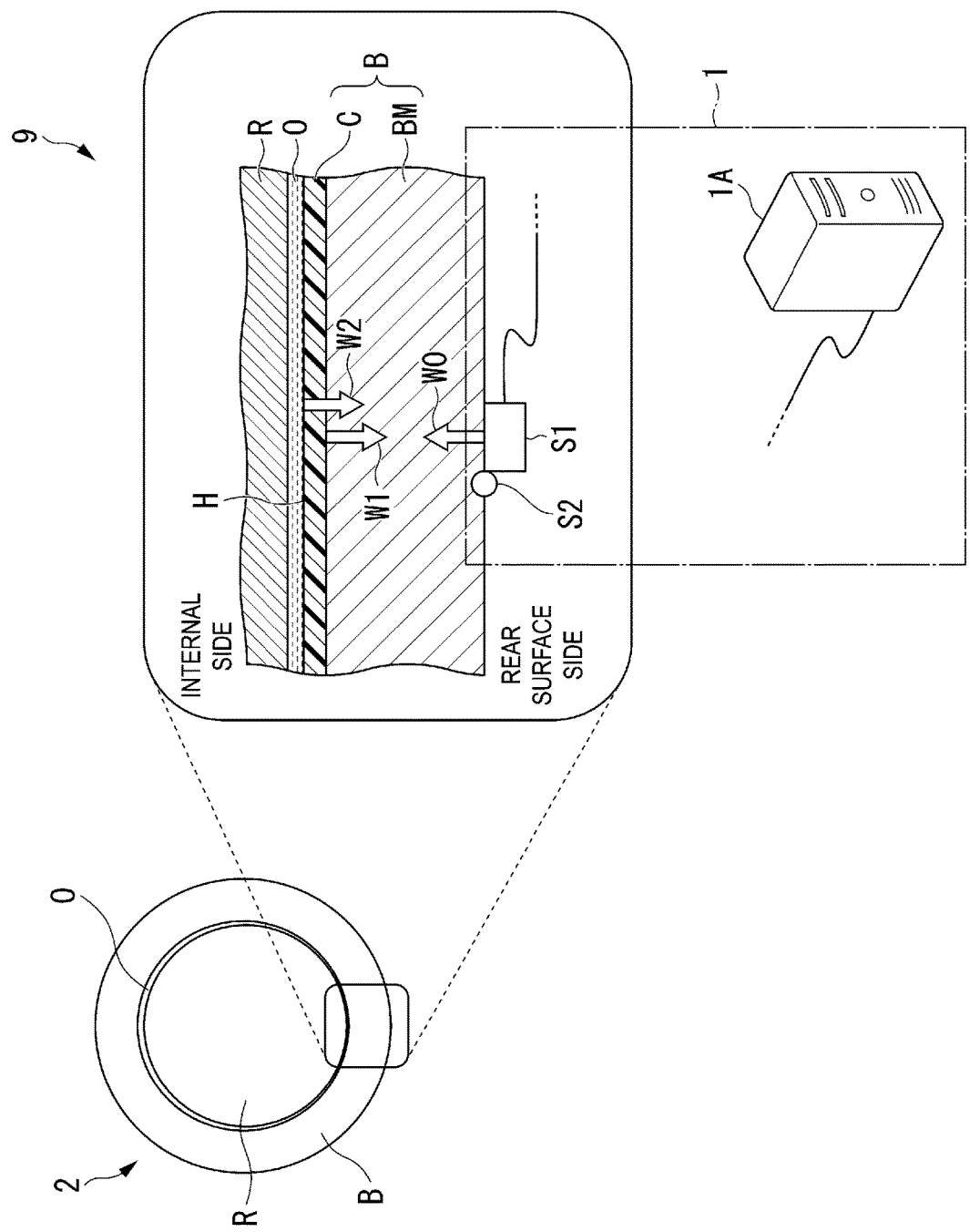
FIG. 1 is a diagram illustrating an overall configuration of a mechanical system according to at least one embodiment of the present disclosure.

FIG. 1 is a diagram illustrating an overall configuration of the mechanical system according to the first embodiment.

As illustrated in FIG. 1, a mechanical system 9 includes a temperature measuring device 1 and a rotary machine 2.

The rotary machine 2 is, for example, a turbine. FIG. 1 illustrates a state where the rotary machine 2 including a bearing B, a rotor R, and an oil layer O is viewed in a rotational axis direction. As illustrated in FIG. 1, the bearing B is a structural body of the rotary machine 2 and has a multilayer structure including a back metal BM and a composite material C. The back metal BM is positioned at a rear surface side of the bearing B and the composite material C is positioned at an internal side of the bearing B. The composite material C is provided to improve load resistance and wear resistance of the bearing B, and is, for example, a PEEK material. The composite material C has a thickness of, for example, approximately 3 mm.

The temperature measuring device 1 constantly monitors the temperature of a surface on the internal side of the bearing during operation of the rotary machine 2. The temperature measuring device 1 can monitor, based on a configuration to be described later, the temperature of the surface on the internal side (hereinafter, also referred to as a "surface on the internal side H") of the bearing in the rotary machine 2 in a timely manner. Accordingly, the mechanical system 9 detects an anomaly in the rotary machine 2 at an early stage, and thus executes an emergency stop of the rotary machine 2 at the early stage.

As illustrated in FIG. 1, the temperature measuring device 1 includes a computer 1A, an ultrasonic sensor S1, and a thermocouple S2 that functions as a reference temperature sensor (as will be described later). Each of the ultrasonic sensor S1 and the thermocouple S2 is installed on a surface on a rear side of the bearing B.

At a constant cycle, the ultrasonic sensor S1 outputs an ultrasonic wave to be incident at the internal side of the bearing B, and observes a reflected wave of the ultrasonic wave. In the description below, the ultrasonic wave outputted from the ultrasonic sensor S1 will also be referred to as an incident wave W0. Additionally, a reflected wave that occurs at an interface between the back metal BM and the composite material C will also be referred to as a first reflected wave W1. A reflected wave that occurs at an interface between the composite material C and the oil layer O (i.e., the surface on the internal side of the bearing B) will also be referred to as a second reflected wave W2.

Installation of Ultrasonic Sensor

Figure 2:
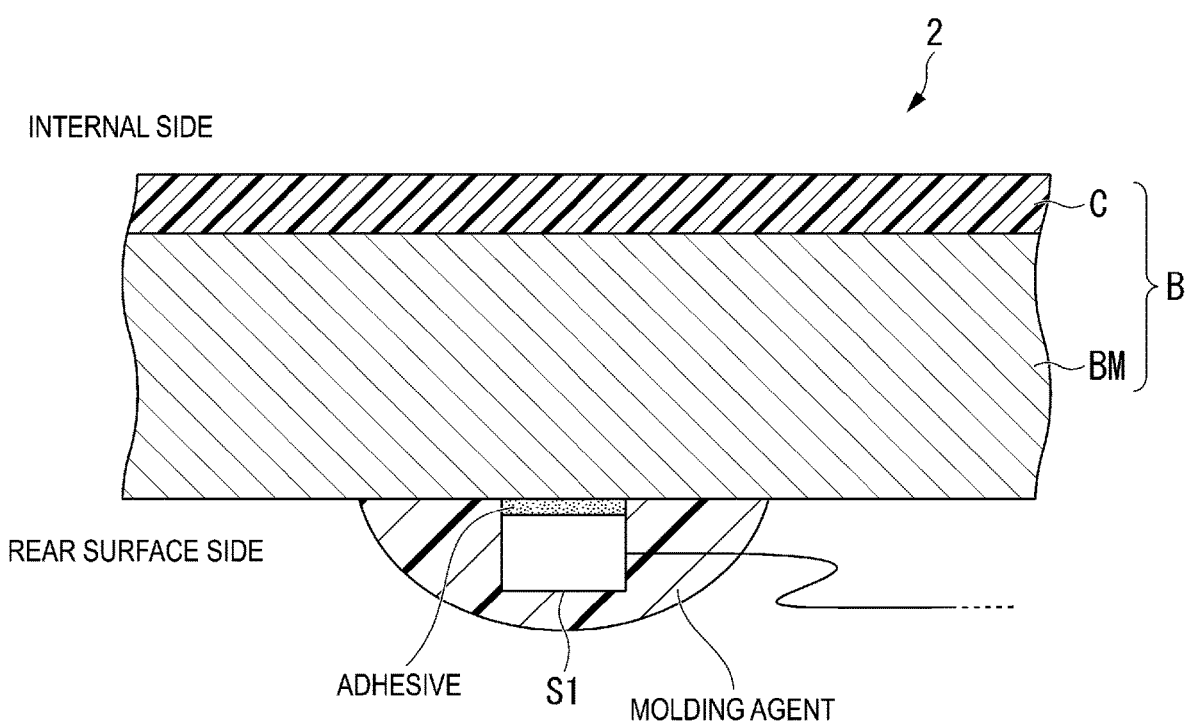
FIG. 2 is a diagram illustrating a method for installing an ultrasonic sensor according to at least one embodiment of the present disclosure.

FIG. 2 is a diagram illustrating a method for installing an ultrasonic sensor according to the first embodiment.

As illustrated in FIG. 2, in the present embodiment, the ultrasonic sensor S1 is installed to be fixed on the surface on the rear side of the bearing B by an adhesive and a molding agent.

Functional Configuration of Temperature Measuring Device

Figure 3:
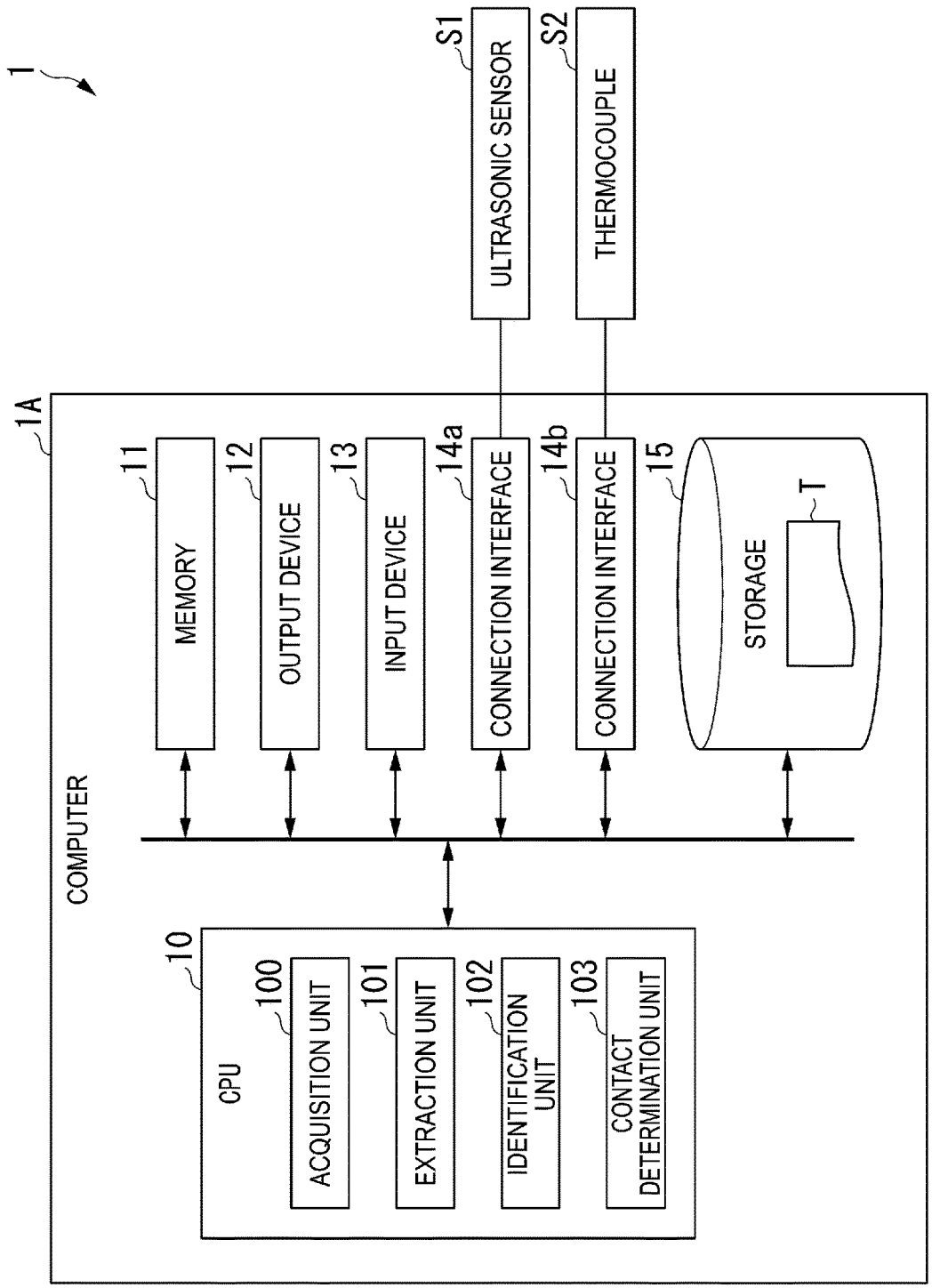
FIG. 3 is a diagram illustrating a functional configuration of a temperature measuring device according to at least one embodiment of the present disclosure.

FIG. 3 is a diagram illustrating a functional configuration of the temperature measuring device according to the first embodiment.

As illustrated in FIG. 3, the computer 1A of the temperature measuring device 1 includes a CPU 10, a memory 11, an output device 12, an input device 13, a connection interface 14a, a connection interface 14b, and a storage 15.

The CPU 10 is a processor configured to execute an overall process in the temperature measuring device 1, and includes various functions to operate in accordance with previously stored programs. The processes executed by the CPU 10 will be more specifically described later.

The memory 11 is a so-called main storage device and stores a command or data required for an operation of the CPU 10.

The output device 12 is an output device such as a display monitor (e.g., a liquid crystal display or an organic EL display) or a speaker.

The input device 13 is an input device such as a mouse, a keyboard, or a touch sensor.

The connection interface 14a is a connection interface for the ultrasonic sensor S1 attached to the bearing B in the rotary machine 2, and the connection interface 14b is a connection interface for the thermocouple S2 attached to the bearing B in the rotary machine 2. Note that, the connection interface 14a includes a pulse control unit and an A/D converter for the ultrasonic sensor S1. The pulse control unit functions to have the ultrasonic wave to be incident, and the A/D converter intakes the reflected wave of the ultrasonic wave.

The storage 15 is a so-called auxiliary storage device and may be, for example, a hard disk drive (HDD) or a solid state drive (SSD). In the present embodiment, an interface temperature table T (described later) is previously stored in the storage 15.

Next, the functions of the CPU 10 will be described.

As illustrated in FIG. 3, the CPU 10 includes functions as an acquisition unit 100, an extraction unit 101, an identification unit 102, and a contact determination unit 103.

The acquisition unit 100 acquires, through the ultrasonic sensor S1, a signal of the reflected wave of the ultrasonic wave (incident wave W0) incident at the internal side of the bearing B. Here, the signal of the reflected wave corresponds to time-series information indicating an intensity of the signal of the reflected wave (the first reflected wave W1 and the second reflected wave W2) of the incident wave W0.

From the signal of the reflected wave that the acquisition unit 100 has acquired, the extraction unit 101 extracts a time domain including the reflected wave reflected on the surface on the internal side H of the bearing B (in other words, including the second reflected wave W2).

Based on a signal of the reflected wave in the time domain that the extraction unit 101 has extracted (in other words, a signal indicating the intensity of the second reflected wave W2), the identification unit 102 identifies the temperature of the surface on the internal side H of the bearing B (hereinafter, also referred to as a "temperature of the surface on the internal side").

The contact determination unit 103 acquires, through the ultrasonic sensor S1, a signal of an ultrasonic wave at a predetermined frequency band, the frequency band being different from that of the incident wave W0 outputted from the ultrasonic sensor S1. Then, based on the signal of the ultrasonic wave, the contact determination unit 103 determines whether or not the bearing B is in contact with the rotor R.

Interface Temperature Table

Figure 4:
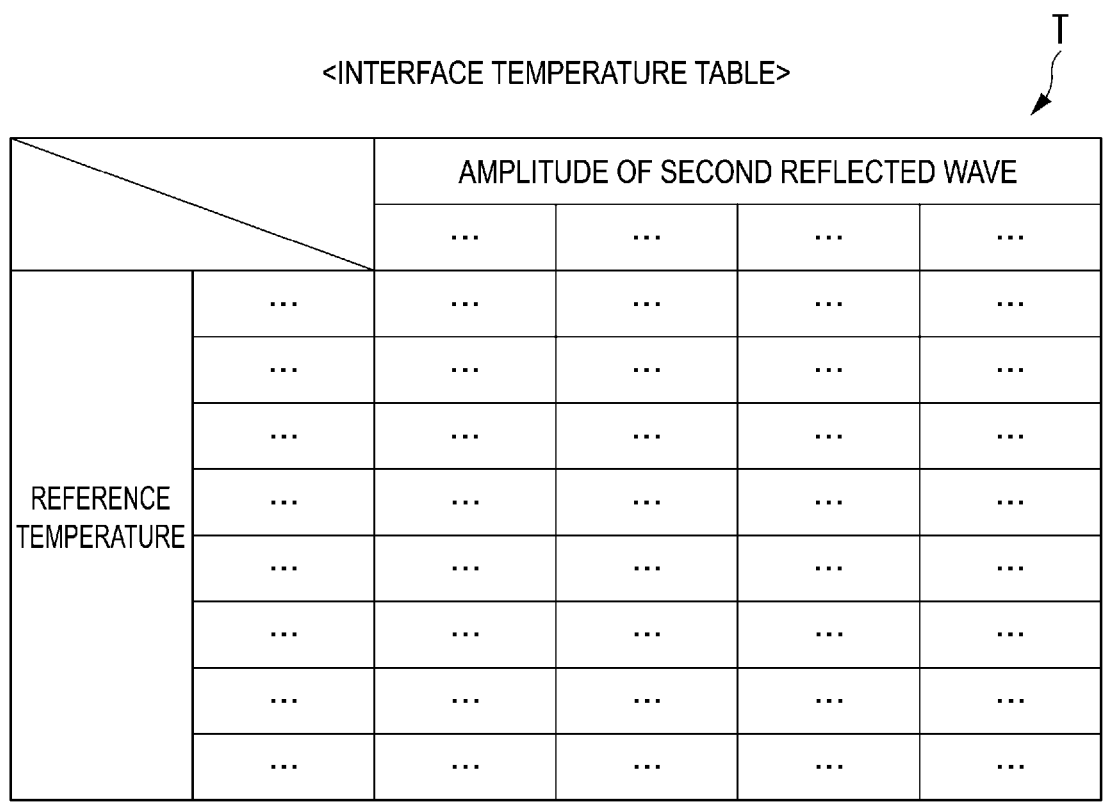
FIG. 4 is a diagram illustrating an example of an interface temperature table according to at least one embodiment of the present disclosure.

FIG. 4 is a diagram illustrating an example of an interface temperature table according to the first embodiment.

As illustrated in FIG. 4, the interface temperature table T is an information table that can be used to uniquely identify the temperature of the surface on the internal side of the bearing B, based on a combination of an "amplitude" of the second reflected wave W2 and a "reference temperature" acquired from the thermocouple S2. The interface temperature table T of this type is stored in advance based on results of simulations separately performed, or the like.

Typically, it is known that reflectance of an ultrasonic wave at an interface increases as a temperature of the interface increases. In other words, the amplitude of the second reflected wave W2 increases as the temperature of the interface (i.e., the temperature of the surface on the internal side of the bearing B) increases. Thus, in the temperature measuring device 1, with reference to the amplitude of the second reflected wave W2, the temperature of the surface on the internal side of the bearing B appears to be identified. However, the intensity of a reflected wave largely depends not only on the temperature of the interface but also on the temperature of a material where the ultrasonic wave propagates. In other words, when each of the incident wave W0 and the second reflected wave W2 is gradually attenuated while propagating in the back metal BM, the temperature of the back metal BM causes an increase or a decrease in the degree of attenuation.

For example, it is assumed that a contact anomaly occurs between the bearing B and the rotor R at a time t, and thus the temperature of the surface on the internal side of the bearing B is increased. At the moment when the anomaly occurs (i.e., the time t), the internal temperature of the back metal BM is standard (i.e., a temperature during normal operation), but as time elapses, a high temperature region gradually spreads from the area where the anomaly occurs toward the rear surface side of the back metal BM. Here, as time elapses, each of the incident wave W0 and the second reflected wave W2 propagates further into the high temperature region within the back metal BM, which increases the degree of attenuation. Accordingly, as time elapses from when the anomaly occurs, the amplitude of the second reflected wave W2, which is actually observed by the ultrasonic sensor S1, gradually decreases from an ideal amplitude in correspondence to the temperature of the surface on the internal side.

In view of this, in order to consider the degree of attenuation caused by the increase in the internal temperature of the back metal BM, the temperature measuring device 1 according to the present embodiment is configured to correct an observed value of the temperature of the surface on the internal side based on the reference temperature that the thermocouple S2 has measured.

As has been described above, the temperature measuring device 1 further includes the thermocouple S2 (as the reference temperature sensor) that is attached, as with the ultrasonic sensor S1, to the rear surface side of the bearing B. The identification unit 102 acquires the temperature of the surface on the rear side of the bearing B (i.e., the reference temperature) from the thermocouple S2 and identifies the temperature of the surface on the internal side of the bearing B based on each of the signal of the reflected wave in the extracted domain and the temperature of the surface on the rear side. Note that, the reference temperature may be measured by, instead of the thermocouple S2, other methods, such as measuring a temperature distribution based on propagation time of the ultrasonic wave.

Flow of Process in Temperature Measuring Device

Figure 5:
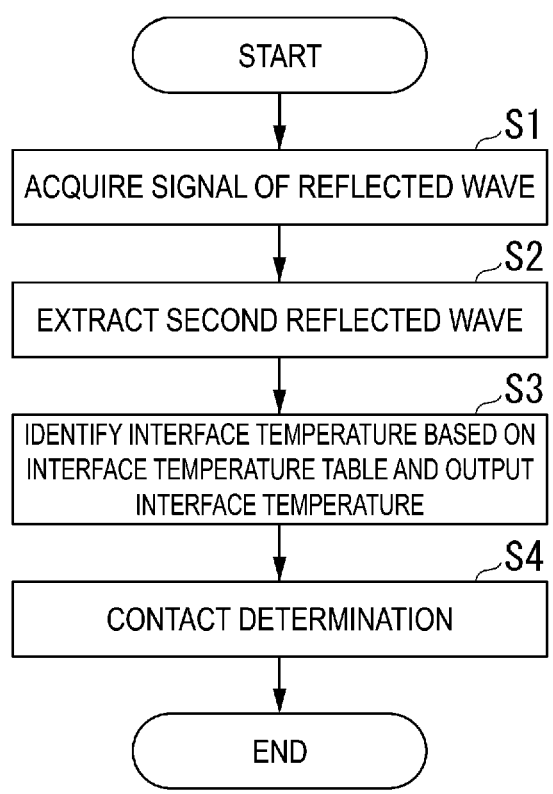
FIG. 5 is a flow diagram illustrating a process executed in the temperature measuring device according to at least one embodiment of the present disclosure.
Figure 6:
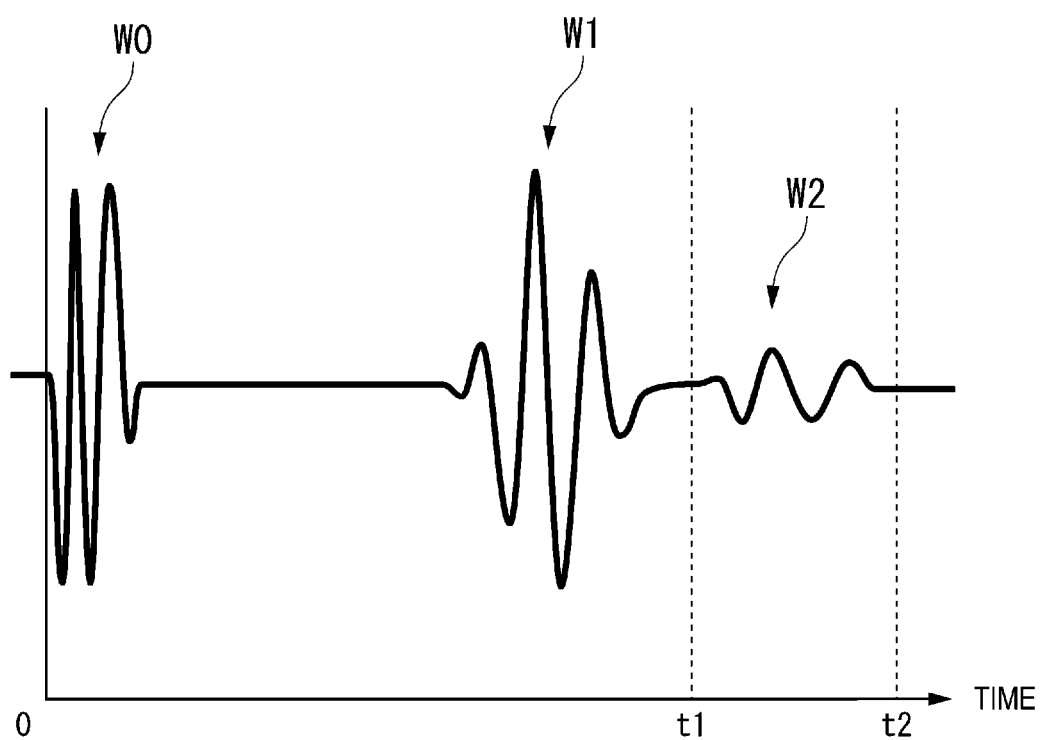
FIG. 6 is an explanatory diagram of the process executed in the temperature measuring device according to at least one embodiment of the present disclosure.

FIG. 5 is a flow diagram illustrating the process executed in the temperature measuring device according to the first embodiment. FIG. 6 is an explanatory diagram of the process executed in the temperature measuring device according to the first embodiment. A flow of the process in the temperature measuring device 1 will be described in detail below with reference to FIGS. 5 and 6. Note that, the flow of the process in FIG. 5 is repeated at a constant cycle during the operation of the rotary machine 2.

First, the acquisition unit 100 of the temperature measuring device 1 acquires the signal of the reflected wave through the ultrasonic sensor S1 (step S01). As previously described, the signal of the reflected wave corresponds to time-series information indicating the intensity of the reflected wave of the incident wave W0 outputted from the ultrasonic sensor S1. The incident wave W0 is outputted as an ultrasonic wave at a frequency of, for example, several MHz order.

FIG. 6 illustrates an example of the signal of the reflected wave acquired by the acquisition unit 100. As illustrated in FIG. 6, after having outputted the incident wave W0, the ultrasonic sensor S1 observes the first reflected wave W1 that is reflected at the interface between the back metal BM and the composite material C, and then observes the second reflected wave W2 that is reflected at the interface between the composite material C and the oil layer O. The ultrasonic sensor S1 has a time gap between observing the first reflected wave W1 and observing the second reflected wave W2, due to a path length difference that corresponds to a thickness of the composite material C. Note that, the reflected wave of the incident wave W0 occurs not only at the interface between the back metal BM and the composite material C or at the interface between the composite material C and the oil layer O but also at an interface between the oil layer O and the rotor R (this reflected wave is also referred to as a third reflected wave). Typically, however, the oil layer O is as extremely thin as several tens of mm. Thus, the third reflected wave is inseparable from the second reflected wave W2 and is regarded as being integrated with the reflected wave W2.

Returning to FIG. 5, based on the signal of the reflected wave acquired in step S01, the extraction unit 101 of the temperature measuring device 1 extracts the time domain including the amplitude of the second reflected wave (step S02). Here, as illustrated in FIG. 6, the extraction unit 101 extracts, for example, a time domain from a time t1 to a time t2, the time domain including the amplitude of only the second reflected wave W2. The time domain from the time t1 to the time t2 is predetermined based on, for example, previous observation results.

Returning to FIG. 5, the identification unit 102 of the temperature measuring device 1 measures the amplitude of the signal of the reflected wave that the extraction unit 101 has extracted, and then acquires the reference temperature from the thermocouple S2. The identification unit 102 subsequently refers to the interface temperature table T (in FIG. 4), to identify and output the interface temperature in correspondence to the amplitude of the second reflected wave W2 and the reference temperature (in other words, the temperature of the surface on the internal side of the bearing B) (step S03).

Next, the contact determination unit 103 of the temperature measuring device 1 determines whether or not the bearing B is in contact with the rotor R (step S04). When the bearing B is in contact with the rotor R, an ultrasonic wave occurs. This ultrasonic wave is at a frequency band of, for example, approximately several hundreds of kHz, and the frequency band is determined based on the structural features of each machine. The frequency band generated by the contact between the bearing B and the rotor R does not overlap the frequency band of the ultrasonic wave outputted from the ultrasonic sensor S1. Accordingly, the contact determination unit 103 monitors, through the ultrasonic sensor S1, whether or not the ultrasonic wave at the frequency band of several hundreds of kHz occurs. Then, when the contact determination unit 103 observes the ultrasonic wave at the frequency band of several hundreds of kHz that exceeds a determination threshold value, the contact determination unit 103 determines that the bearing B is in contact with the rotor R, and outputs the determination.

Operational Effects

As has been described above, the temperature measuring device 1 according to the first embodiment includes the ultrasonic sensor S1 attached to the rear surface side of the bearing B having the multilayer structure, the acquisition unit 100 configured to, through the ultrasonic sensor S1, acquire the signal of the reflected wave of the ultrasonic wave incident at the internal side of the bearing B, the extraction unit 101 configured to, from the signal of the reflected wave that the acquisition unit 100 has acquired, extract a domain including the reflected wave (second reflected wave W2) reflected on the surface on the internal side H of the bearing B, and the identification unit 102 configured to, based on the signal of the reflected wave in the domain that the extraction unit 101 has extracted, identify the temperature of the surface on the internal side of the bearing B.

With this configuration, it is possible to accurately estimate the temperature of the surface on the internal side of the bearing B having the multilayer structure by referring to the amplitude of the reflected wave of the ultrasonic wave. Thus, with the temperature measuring device 1 according to the first embodiment, it is possible to monitor, in a timely manner, the temperature of the surface on the internal side of the bearing having the multilayer structure.

The temperature measuring device 1 according to the first embodiment further includes the reference temperature sensor (i.e., the thermocouple S2) attached to the rear surface side of the bearing B. The identification unit 102 acquires the temperature of the surface on the rear side of the bearing B (i.e., a reference temperature) from the thermocouple S2, and identifies the temperature of the surface on the internal side of the bearing B based on each of the intensity of the signal of the reflected wave (i.e., the amplitude of the second reflected wave W2) and the temperature of the surface on the rear side.

With this configuration, it is possible to identify the temperature of the surface on the internal side of the bearing B (back metal BM), while considering an influence of the attenuation of the ultrasonic wave in the bearing B (back metal BM).

The temperature measuring device 1 according to the first embodiment further includes the contact determination unit 103. The contact determination unit 103 acquires, through the ultrasonic sensor S1, the signal of the ultrasonic wave at a predetermined frequency band (of several hundreds of kHz), and based on the signal of the ultrasonic wave acquired, determines whether or not the bearing B is in contact with the rotor R.

With this configuration, it is possible to detect a temperature anomaly and concurrently detect a contact anomaly, and it is thus possible to provide a safer mechanical system.

Modifications of First Embodiment

A modification of the first embodiment will be described below.

In the description of the first embodiment, the identification unit 102 refers to the interface temperature table T to identify the temperature of the surface on the internal side based on the combination of the amplitude of the second reflected wave and the reference temperature; however, other embodiments are not limited thereto.

For example, an identification unit 102 according to a modification of the first embodiment may use a model function f, where an amplitude of a second reflected wave and a reference temperature function as explanation variables (X1 and X2) and a temperature of a surface on an internal side functions as an objective variable (Y), to calculate Y=f(X1 and X2). Then, based on the calculation, the identification unit 102 may identify the temperature of the surface on the internal side. In this case, parameters of the model function f may be learned and identified by machine learning.

Figure 7:
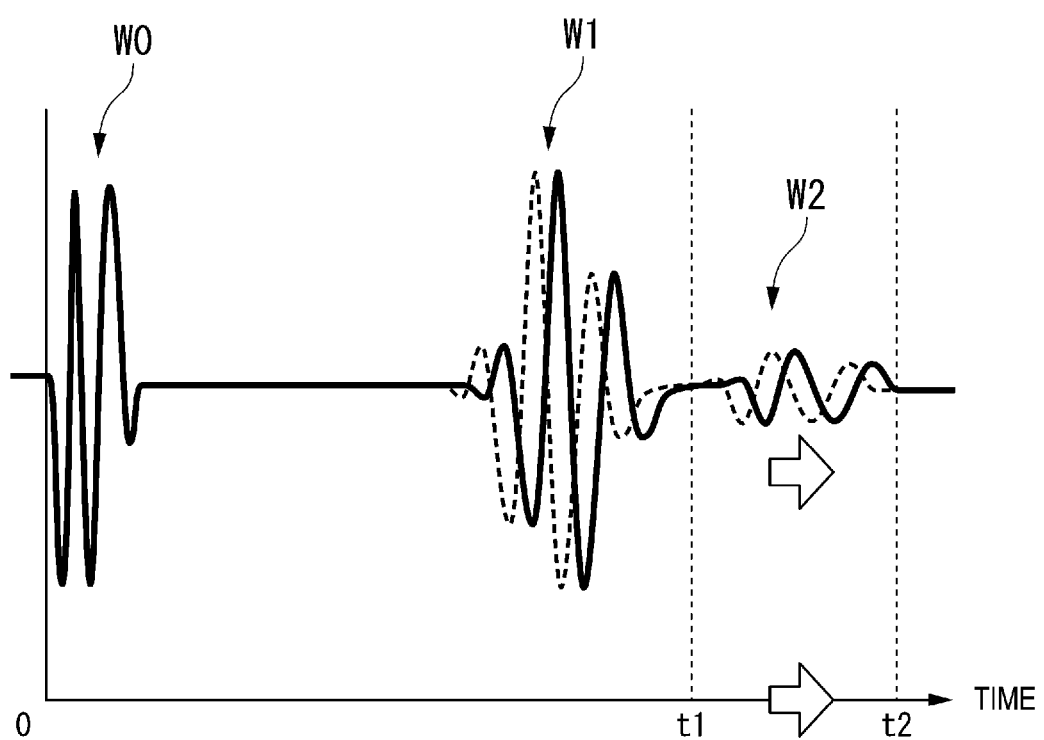
FIG. 7 is an explanatory diagram illustrating a process executed in a temperature measuring device according to at least one embodiment of the present disclosure.

FIG. 7 is an explanatory diagram illustrating a process executed in a temperature measuring device according to another modification of the first embodiment.

Next, the other modification of the first embodiment will be described with reference to FIG. 7.

It is known that, in response to a change in internal temperature of the back metal BM, propagation speed of an ultrasonic wave is changed. In response to the change in the internal temperature of the back metal BM, the time at which a second reflected wave W2 reaches is changed with respect to the time at which an incident wave W0 is outputted. In view of this, an extraction unit 101 according to the present modification may change a time domain (from a time t1 to a time t2) where the second reflected wave W2 is extracted, in accordance with the reference temperature acquired from a thermocouple S2. Alternatively, the degree of the change of the time domain with respect to the reference temperature may correspond to one of the parameters identified by the machine learning.

Second Embodiment

A mechanical system according to a second embodiment will be described below with reference to FIG. 8.

Figure 8:
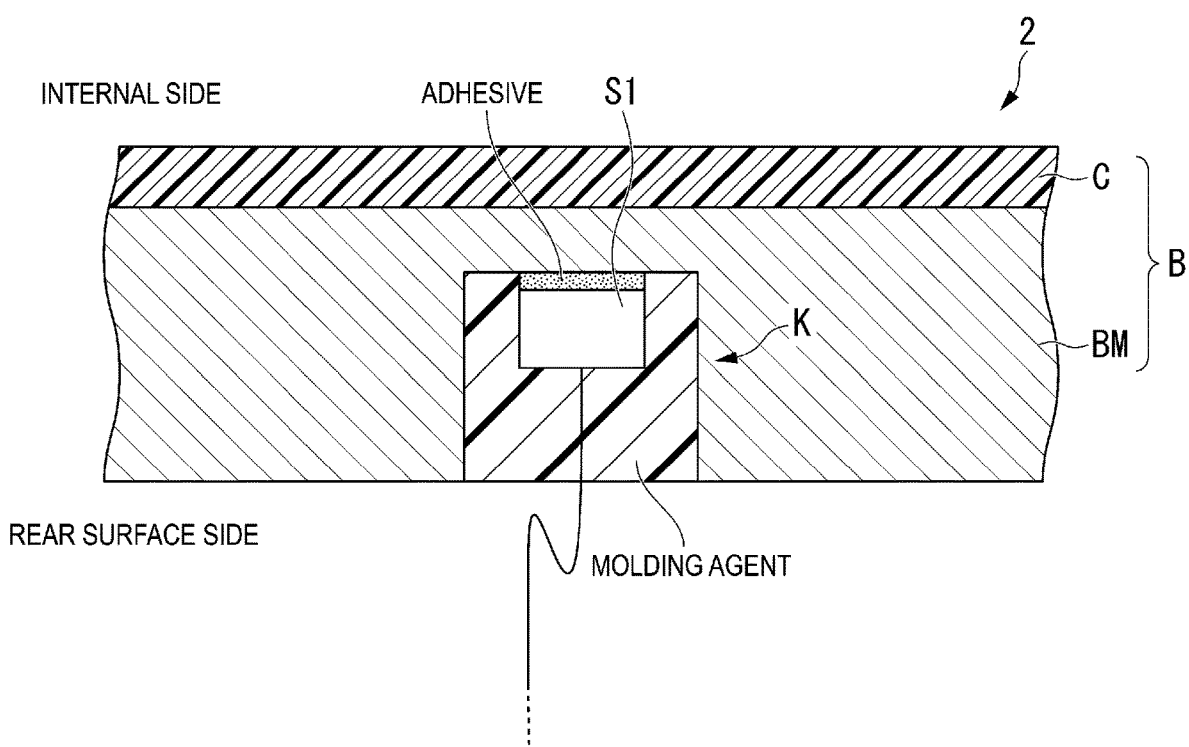
FIG. 8 is a diagram illustrating a method for installing an ultrasonic sensor according to at least one embodiment of the present disclosure.

FIG. 8 is a diagram illustrating a method for installing an ultrasonic sensor according to the second embodiment.

As illustrated in FIG. 8, a bearing B in a rotary machine 2 according to the second embodiment has a recess K formed inward from a surface on a rear side. An ultrasonic sensor S1 of a temperature measuring device 1 is attached to the recess K. Note that, while not illustrated, as with the ultrasonic sensor S1, a thermocouple S2 is also attached to the recess K.

With this configuration, each of an incident wave W0 and a second reflected wave W2 physically propagates a shorter distance in a back metal BM. Here, while propagating in the back metal BM, each of the incident wave W0 and the second reflected wave W2 has a reduced degree of attenuation, thereby increasing an intensity of a signal of the second reflected wave W2 that the ultrasonic sensor S1 observes. Accordingly, it is possible to accurately grasp an amplitude of the second reflected wave W2 changed in response to a change in the temperature of the surface on the internal side, and it is thus possible to detect the temperature of the surface on the internal side more accurately.

Modifications of Second Embodiment

Figure 9:
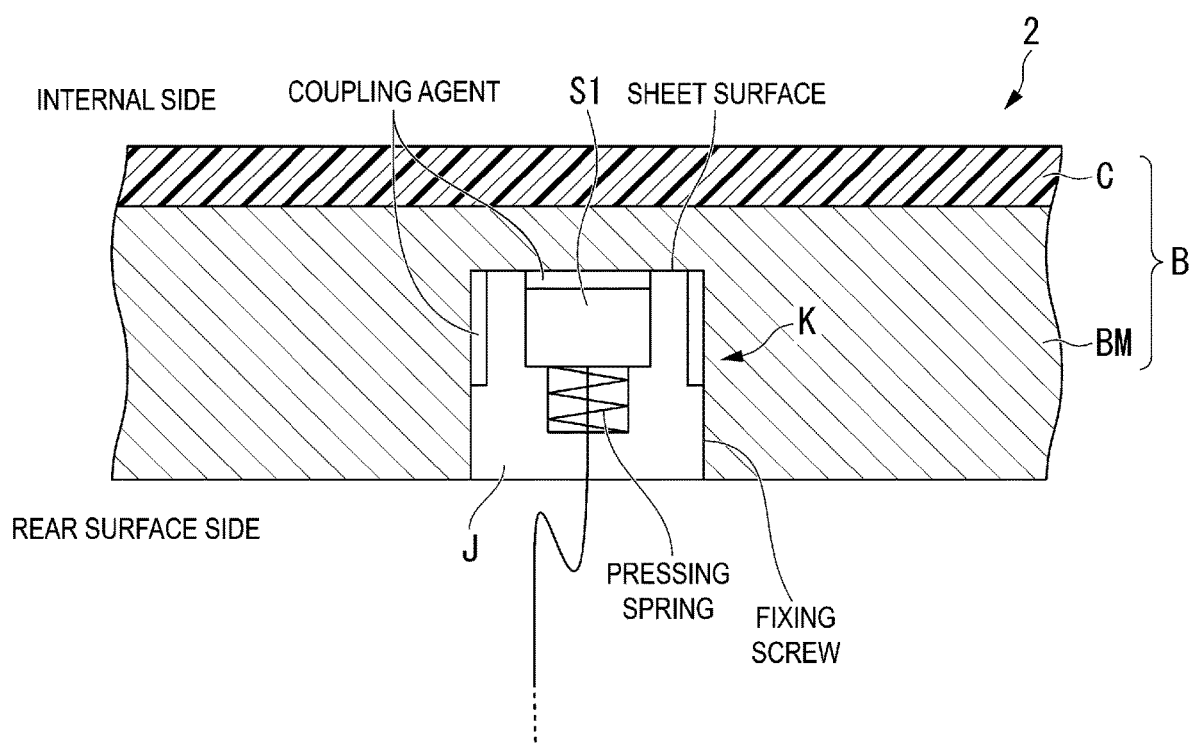
FIG. 9 is a diagram illustrating a method for installing an ultrasonic sensor according to at least one embodiment of the present disclosure.
Figure 10:
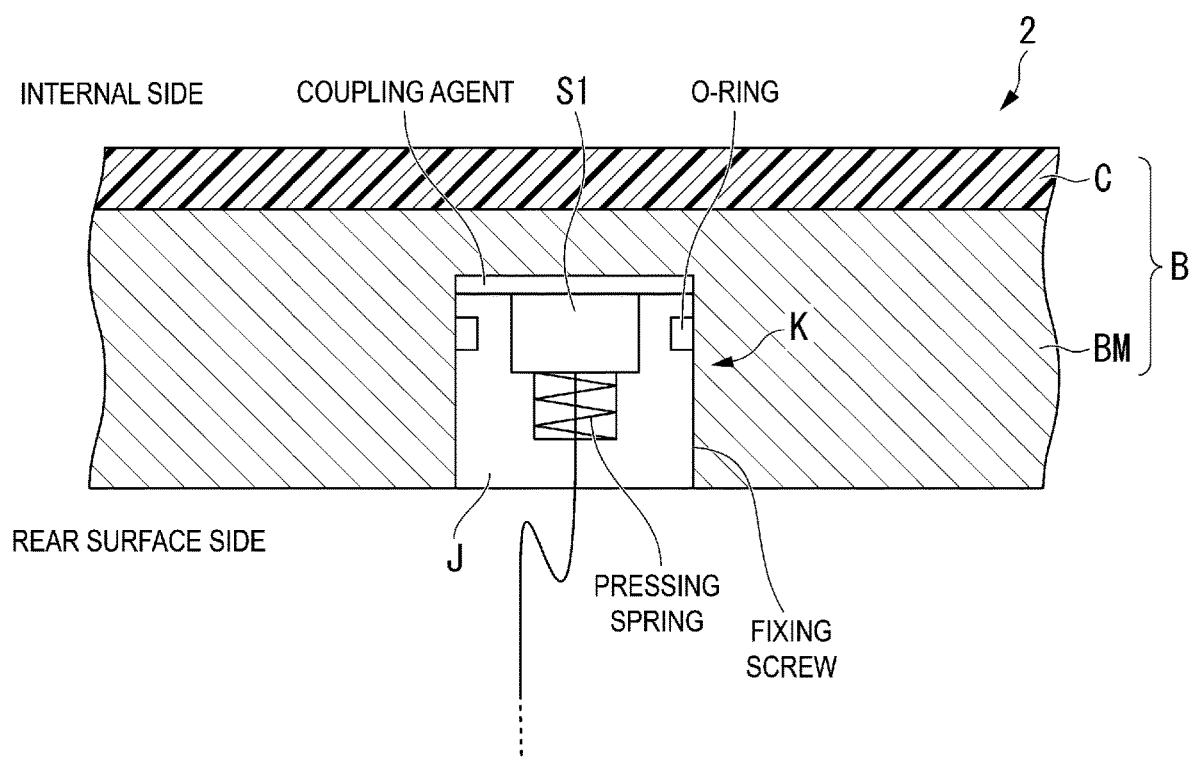
FIG. 10 is a diagram illustrating a method for installing an ultrasonic sensor according to at least one embodiment of the present disclosure.

Each of FIG. 9 and FIG. 10 is a diagram illustrating a method for installing an ultrasonic sensor according to a modification of the second embodiment.

In a mechanical system 9 according to the modification of the second embodiment, as illustrated in FIGS. 9 and 10, an ultrasonic sensor S1 may be attached into a recess K with, for example, a fixture J.

More specifically, the recess K includes, on a surface on an internal side, a screw groove, and the fixture J is attached into the recess K as a fixing screw.

With this configuration, it is possible to reduce workload in replacing the ultrasonic sensor S1.

Further, in the description of each of the foregoing embodiments and modifications, the temperature measuring device 1 includes the thermocouple S2 (reference temperature sensor), but other embodiments are not limited thereto. In other words, a temperature measuring device 1 according to other embodiments may measure a temperature of the surface on the internal side of the bearing B only based on an intensity of a signal (amplitude) of a second reflected wave W2 that an ultrasonic sensor S1 observes. In this case, while a high temperature region (caused by heat generation) gradually spreads within a back metal BM, the temperature measuring device 1 may, for example, cumulatively measure a moment-by-moment (temporal) change in attenuation of a second reflected wave W2, so as to identify the temperature of the surface on the internal side. In other words, the temperature measuring device 1 may cumulatively measure a change in amplitude of the second reflected wave W2 from when the back metal BM is in an initial temperature, so as to identify the temperature of the surface on the internal side.

Third Embodiment

Next, a mechanical system according to a third embodiment will be described with reference to FIG. 11.

Configuration of Mechanical System

Figure 11:
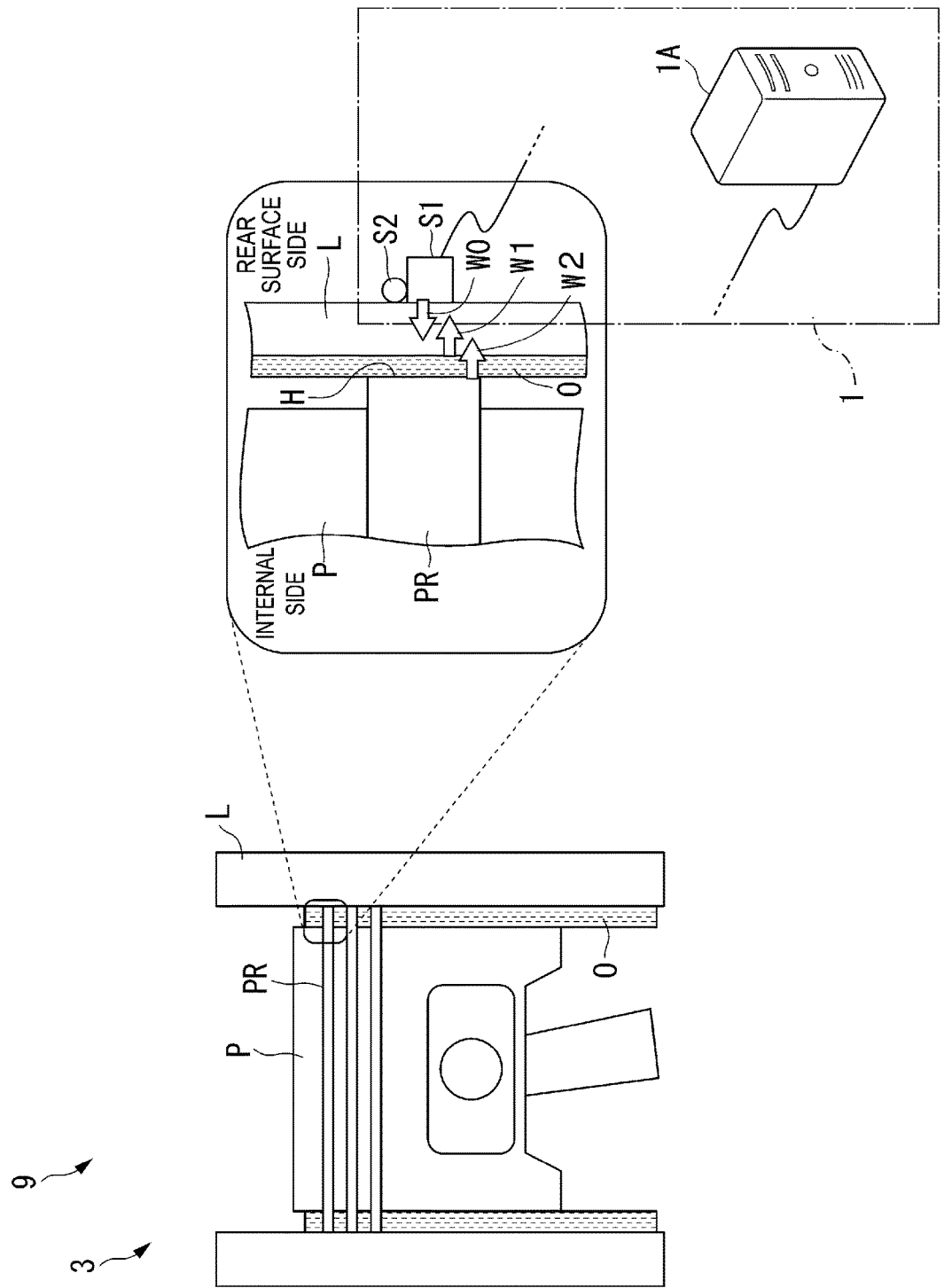
FIG. 11 is a diagram illustrating a partial configuration of a mechanical system according to at least one embodiment of the present disclosure.

FIG. 11 is a diagram illustrating a configuration of a mechanical system according to at least one embodiment of the present disclosure. As illustrated in FIG. 11, a mechanical system 9 according to the present embodiment includes an internal combustion engine 3 serving as an engine. Here, a temperature measuring device 1 is configured to measure a temperature of a multilayer structure (a cylinder liner L and an oil layer O) of a structural body of the internal combustion engine 3 (in the present embodiment, a set of the cylinder liner L and the oil layer O corresponds to a "structural body having a multilayer structure"). The temperature measuring device 1 is configured to measure a temperature of a surface (surface on the internal side H) of a piston ring PR in a piston P that is disposed at an internal side of the cylinder liner L and the oil layer O.

An ultrasonic sensor S1 of the mechanical system 9 is installed at a rear surface side of the cylinder liner L. The ultrasonic sensor S1 outputs an incident wave W0 inward of the cylinder liner L, and observes each of a first reflected wave W1 and a second reflected wave W2. In the present embodiment, as illustrated in FIG. 11, the first reflected wave W1 corresponds to a reflected wave at an interface between the cylinder liner L and the oil layer O. The second reflected wave W2 corresponds to a reflected wave at an interface between the oil layer O and the piston ring PR. With the temperature measuring device 1 according to the present embodiment, it is possible to measure, in a timely manner, a temperature of the surface of the piston ring PR based on an observation result of an amplitude of the second reflected wave W2.

In the forgoing embodiments, various processes of the temperature measuring device 1 are stored as programs in a computer readable recording medium, and each of the programs is read and executed by a computer such that a corresponding one of the various processes is performed. The computer readable recording medium refers to a magnetic disk, a magneto-optical disk, a CD-ROM, a DVD-ROM, a semiconductor memory, or the like. Also, this computer program may be distributed to the computer on a communication circuit, and the computer that receives this distribution may execute the program.

The program may be a program for implementing some of the functions described above. Furthermore, the program may be a so-called differential file (differential program) that can implement the above-described functions in combination with a program already recorded in the computer system.

In the foregoing, certain embodiments of the disclosure have been described, but all of these embodiments are merely illustrative and are not intended to limit the scope of the disclosure. These embodiments may be implemented in various other forms, and various omissions, substitutions, and alterations may be made without departing from the gist of the disclosure. These embodiments and modifications are included in the scope and gist of the disclosure and are also included in the scope of the disclosure described in the claims and equivalents thereof.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A temperature measuring device comprising:
an ultrasonic sensor attached to a rear surface side of a structural body having a multilayer structure;
an acquisition unit configured to, through the ultrasonic sensor, acquire a signal of a reflected wave of an ultrasonic wave incident at an internal side of the structural body;
an extraction unit configured to, from the signal of the reflected wave, extract a domain including a reflected wave reflected on a surface on the internal side of the structural body;
an identification unit configured to, based on a signal of the reflected wave in the extracted domain, identify a temperature of the surface on the internal side of the structural body;
means to measure a reference temperature of the structural body; and
a storage configured to store an interface temperature table which defines a relationship between an amplitude of the reflected wave, the reference temperature, and the temperature of the surface on the internal side of the structural body, wherein
the identification unit acquires the reference temperature and identifies the temperature of the surface on the internal side of the structural body based on both of intensity of the signal of the reflected wave which indicates an amplitude of the reflected wave and the reference temperature by referring to the interface temperature table.

2. The temperature measuring device according to claim 1, further comprising a contact determination unit configured:
  to acquire, through the ultrasonic sensor, a signal at a predetermined frequency band; and
  to determine, based on the signal acquired, whether contact occurs in the structural body.

3. A mechanical system, comprising:
  the temperature measuring device described in claim 1; and
  a machine including the structural body, wherein
  the structural body includes a recess formed inward from a surface on a rear side of the structural body, and
  the ultrasonic sensor is attached to the recess.

4. A temperature measuring method using an ultrasonic sensor attached to a rear surface side of a structural body having a multilayer structure, the temperature measuring method comprising the steps of:
  acquiring, through the ultrasonic sensor, a signal of a reflected wave of an ultrasonic wave incident at an internal side of the structural body;
  extracting, from the signal of the reflected wave, a domain including a reflected wave reflected on a surface on the internal side of the structural body;
  identifying, based on a signal of the reflected wave in the extracted domain, a temperature of the surface on the internal side of the structural body; and
  measuring a reference temperature of the structural body, wherein
  in the step of identifying, the temperature of the surface on the internal side of the structural body is identified based on both of intensity of the signal of the reflected wave which indicates an amplitude of the reflected wave and the reference temperature by referring to an interface temperature table which defines a relationship between the amplitude of the reflected wave, the reference temperature, and the temperature of the surface on the internal side of the structural body.

5. A non-transitory computer readable storage medium storing a program executed by a computer of a temperature measuring device including an ultrasonic sensor attached to a rear surface side of a structural body having a multilayer structure, the program comprising the steps of:
  acquiring, through the ultrasonic sensor, a signal of a reflected wave of an ultrasonic wave incident at an internal side of the structural body;
  extracting, from the signal of the reflected wave, a domain including a reflected wave reflected on a surface on the internal side of the structural body;
  identifying, based on a signal of the reflected wave in the extracted domain, a temperature of the surface on the internal side of the structural body; and
  measuring a reference temperature of the structural body, wherein
  in the step of identifying, the temperature of the surface on the internal side of the structural body is identified based on both of intensity of the signal of the reflected wave which indicates an amplitude of the reflected wave and the reference temperature by referring to an interface temperature table which defines a relationship between the amplitude of the reflected wave, the reference temperature, and the temperature of the surface on the internal side of the structural body.

* * * * *